(12) United States Patent
Kishikawa et al.

(10) Patent No.: US 8,768,986 B2
(45) Date of Patent: Jul. 1, 2014

(54) RECORDING APPARATUS AND METHOD FOR FAT FILE

(75) Inventors: Masashi Kishikawa, Kanagawa (JP); Masayuki Tamura, Kanagawa (JP); Tsutomu Shimosato, Kanagawa (JP); Yuichi Motomura, Kanagawa (JP); Hisao Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 185 days.

(21) Appl. No.: 13/020,233

(22) Filed: Feb. 3, 2011

(65) Prior Publication Data

US 2011/0196904 A1      Aug. 11, 2011

(30) Foreign Application Priority Data

Feb. 10, 2010   (JP) ................................ P2010-027363

(51) Int. Cl.
*G06F 17/30* (2006.01)

(52) U.S. Cl.
USPC ........................................................ 707/829

(58) Field of Classification Search
USPC ................................................ 707/821–829
See application file for complete search history.

(56) References Cited

U.S. PATENT DOCUMENTS

| | | | |
|---|---|---|---|
| 7,475,185 B2 | 1/2009 | Nakanishi et al. | |
| 2004/0111582 A1* | 6/2004 | Maeda et al. | 711/202 |
| 2005/0069292 A1* | 3/2005 | Yokota et al. | 386/95 |
| 2005/0083794 A1* | 4/2005 | Tagawa et al. | 369/30.08 |
| 2007/0162707 A1* | 7/2007 | So et al. | 711/154 |
| 2008/0172426 A1* | 7/2008 | Patel et al. | 707/205 |

FOREIGN PATENT DOCUMENTS

JP      2005 103903       11/2005

* cited by examiner

*Primary Examiner* — Khanh Pham
(74) *Attorney, Agent, or Firm* — Frommer Lawrence & Haug LLP; William S. Frommer

(57) ABSTRACT

Disclosed herein is an information recording apparatus including: a loading section configured to be loaded with a recording medium for managing a file on the basis of at least one of an FAT file system and a file system similar thereto; and a control section configured, in updating at least one directory entry recorded to an area in a second and subsequent clusters in a recording area of directory entries in a predetermined directory in the recording medium, to read data, update at least the one directory entry, record the updated data, and update the FAT of the recording medium and management information similar to the FAT such that the area in which the updated data of the area in the second and subsequent clusters is recorded is linked to the area in a first cluster of the recording area in the predetermined directory.

10 Claims, 12 Drawing Sheets

RECORDING APPARATUS AND METHOD FOR FAT FILE

BACKGROUND OF THE INVENTION

1. Field of the Invention

The present invention relates to an information recording apparatus configured to record information to recording medium based on a FAT (File Allocation Tables) file system or a file system similar thereto, an imaging apparatus having this information recording apparatus, an information updating method, and an information updating program.

2. Description of the Related Art

Various types of file systems have been developed for systems that manage data files stored in recording medium. One of these data file management systems is the FAT file system. For this FAT file system, various types of information updating technologies have been proposed (see PCT Patent Publication No. WO2005/103903 hereinafter referred to as Patent Document 1).

Patent Document 1 discloses a nonvolatile storage system configured by a nonvolatile storage apparatus and an access apparatus. With this storage system, in writing file data to the main memory of the nonvolatile storage apparatus, the file data and the directory entry are written to different allocation units. Using such a file management technique facilitates the continuous writing of file data and, at the same time, decreases the number of times a file is copied at updating the directory entry.

SUMMARY OF THE INVENTION

The FAT file system has the following problems unique to the configuration thereof. The FAT file system cannot execute a FAT rewrite operation and a directory entry update (or logical replacement) operation at the same time. In addition, in order to prevent read/write errors from happening, FAT is duplicated with a backup area, but the directory entry does not have such a duplicate structure.

In the FAT file system described above, if the processing of two or more update operations is discontinued (by assigning a part of a file as another file, for example), an inconsistency may occur between the FAT information and the contents of directory entry. If such an inconsistency occurs between both the management information items, not only a desired state (a directory structure and/or a file structure) cannot be obtained after the update processing, but also the state before the update processing cannot be restored.

Therefore, the present invention addresses the above-identified and other problems associated with known methods and apparatuses and solves the problems by providing an information recording apparatus, an imaging apparatus, an information updating method, and an information updating program that are configured to provide the above-mentioned integrity between management information items to enhance data security if information update processing is discontinued for some reason in the FAT file system or any other similar file systems.

In carrying out the invention and according to one embodiment thereof, there is provided an information recording apparatus. This information recording apparatus has a loading section on which a recording medium for managing a file on the basis of at least one of a FAT file system and a file system similar thereto is loaded and a control section. The control section, in updating at least one directory entry recorded to an area in a second and subsequent clusters in a recording area of directory entries in a predetermined directory in the recording medium, reads data of a recording area of the directory entries from the recording medium. Also, the control section updates at least the one directory entry recorded to the area of the second and subsequent clusters. Next, the control section records the updated data of the area in the second and subsequent clusters to a free area in the recording medium. Then, the control section updates the FAT of the recording medium and management information similar to the FAT such that the area in which the updated data of the area in the second and subsequent clusters is recorded is linked to the area in the first cluster of the recording area in the predetermined directory.

It should be noted that "a file system similar to the FAT file system" herein denotes a file system having file management information including at least file name, file size, and file start position in a recording medium and arrangement management information indicative of arrangements in the recording medium of the items of information logically consecutive in each file or directory, in which the file management information and the arrangement management information are recorded to separate locations. "Management information similar to FAT" herein denotes information indicative of the link between the data areas managed on a predetermined unit basis, such as cluster for example, in the format of the recording medium.

The imaging apparatus according to the present invention has an imaging section and the above-mentioned information recording apparatus. The control section controls the predetermined processing to be executed on the data taken by the imaging section.

The information editing method and program according to the invention are configured to execute information update processing on the recording medium loaded on the information recording apparatus. This recording medium manages files on the basis of the FAT file system or a file system similar thereto. Also, the information updating method and program are configured to update at least one directory entry recorded to an area in a second and subsequent clusters in a recording area of directory entries in a predetermined directory in the recording medium. In the information updating method and program according to the present invention, first the information recording apparatus reads the data of the recording area from the recording medium. Next, the information recording apparatus updates at least one directory entry in the area in the second and subsequent clusters in the read recording area. Then, the information recording apparatus records the updated data of the area in the second and subsequent clusters to a free area in the recording medium. Finally, the information recording apparatus updates the FAT of the recording medium and management information similar to the FAT such that the area in which the updated data of the area in the second and subsequent clusters is recorded is linked to the area in the first cluster of the recording area in the predetermined directory.

As described above and according to the invention, updating information by the above-mentioned technique according to the invention allows the rewriting of the FAT and the management information similar thereto and the updating of directory entries concurrently at the time of information updating. The principle of this technique will be detailed later. Consequently, the embodiments of the present invention provides advantages of the prevention of the inconsistencies between the FAT or the management information similar thereto and the contents of directory entries and the enhancement of data security.

DETAILED DESCRIPTION OF THE PREFERRED EMBODIMENTS

This invention will be described in further detail by way of embodiments thereof with reference to the accompanying drawings. The description will be made in the following order:

1, an exemplary configuration of an information recording apparatus; and 2, an exemplary operation of update processing.

<1. Configuration of Information Recording Apparatus>

Figure 1:
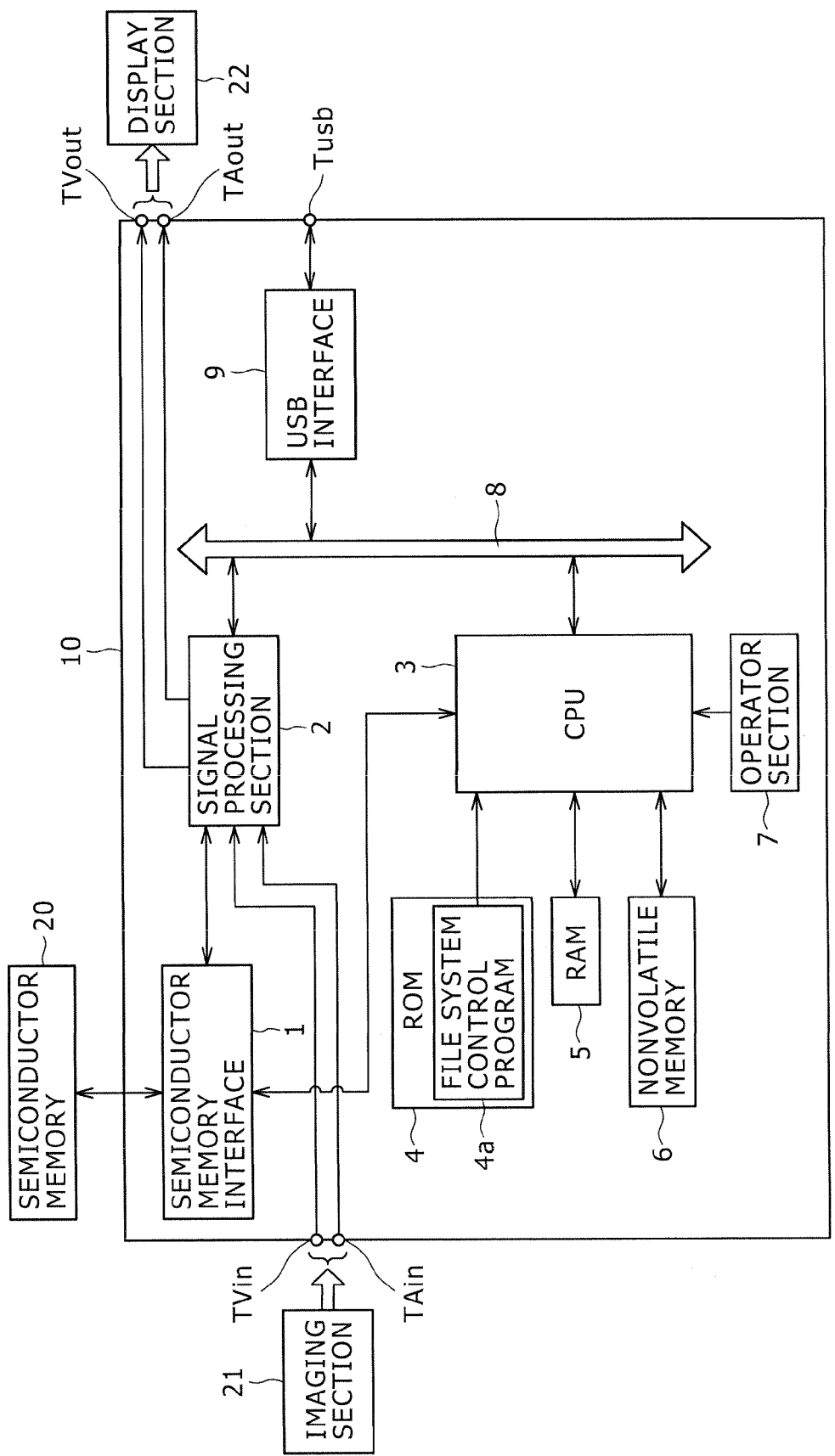
FIG. 1 is a schematic block diagram illustrating a recording/reproducing apparatus practiced as one embodiment of the invention.

Now, referring to FIG. 1, there is shown a schematic block diagram illustrating an information recording apparatus practiced as one embodiment of the invention. It should be noted that the example shown in FIG. 1 shows a recording/reproducing apparatus 10 for use in a system for editing video data and so on taken by an imaging block 21 based on an external camera apparatus for example.

With respect to the present embodiment, the recording/reproducing apparatus 10 configured to record and/or reproduce video data on recording medium based on the FAT file system is described by way of example; however the present invention is not restricted to this example. The present invention is likewise applicable to any other recording/reproducing apparatuses configured to record and/or reproduce information on recording medium based on a file system similar to the FAT file system, providing substantially the same effects as the recording/reproducing apparatus based on the FAT file system. In addition, with respect to the present embodiment, use of a nonvolatile semiconductor memory card 20 for recording medium is described by way of example; however, the present invention is not restricted to this example. Any other recording medium are available as far as these recording medium can manage information on the basis of the FAT file system.

The recording/reproducing apparatus 10 (or the information recording apparatus) has a semiconductor memory interface 1, a signal processing section 2, a CPU (Central Processing Unit) 3, a ROM (Read Only Memory) 4, a RAM (Random Access Memory) 5, a nonvolatile memory 6, and an operator section 7. In addition, the recording/reproducing apparatus 10 has a bus 8 and a USB (Universal Serial Bus) interface 9.

Besides, the recording/reproducing apparatus 10 has a video input terminal TVin and an audio input terminal TAin. In the present embodiment, the video data and the audio data outputted from the external imaging apparatus 21 are supplied to the recording/reproducing apparatus 10 via the video input terminal TVin and the audio input terminal TAin, respectively. The recording/reproducing apparatus 10 also has a video output terminal TVout and an audio output terminal TAout. In the present embodiment, the video data and the audio data processed in the recording/reproducing apparatus 10 in a predetermined manner are outputted to an external display section 22 based on a display monitor for example via the video output terminal TVout and the audio output terminal TAout, respectively. Further, the recording/reproducing apparatus 10 has a USB terminal Tusb. The recording/reproducing apparatus 10 is connectable to an external apparatus, not shown, such as a personal computer for example, via the USB terminal Tusb. Therefore, the recording/reproducing apparatus 10 can execute data communication with an external apparatus via the USB terminal Tusb and a USB cable, not shown, connected thereto.

The semiconductor memory interface 1 (the loading block) is connected to the signal processing section 2 and the CPU 3. In the present embodiment, loading a semiconductor memory card 20 onto the semiconductor memory interface 1 from the outside enables the signal processing section 2 and the CPU 3 to execute information recording and/or reproducing operations on the semiconductor memory card 20. It should noted that, in the example shown in FIG. 1, the semiconductor memory card 20 and the recording/reproducing apparatus 10 are separate from each other; however, it is also practicable for the recording/reproducing apparatus 10 to incorporate the semiconductor memory card 20 in advance.

The signal processing section 2, connected to the video input terminal TVin, executes various kinds of video signal processing operations on the video data entered through the video input terminal TVin. In addition, connected to the audio input terminal TAin, the signal processing section 2 executes various kinds of audio signal processing operations on the audio data entered through the audio input terminal TAin.

Further, connected to the video output terminal TVout, the signal processing section 2 outputs the video data on which predetermined video signal processing has been executed to the external display section 22 through the video output terminal TVout. Still further, connected to the audio output terminal TAout, the signal processing section 2 outputs the audio data on which predetermined audio signal processing has been executed to the external display section 22 through the audio output terminal TAout.

In addition, under the control of the CPU 3, the signal processing section 2 can read data from the semiconductor memory card 20, execute predetermined edit processing on this data, and write (or overwrite) the edited data to the semiconductor memory card 20.

The CPU 3 (or the control block) is directly connected to the semiconductor memory interface 1, the ROM 4, the RAM 5, the nonvolatile memory 6, and the operator section 7. Also, the CPU 3 is connected to the signal processing section 2 and the USB interface 9 via the bus 8 to input and output various kinds of control signals and data through the signal processing section 2, the USB interface 9, and the bus 8.

Further, the CPU 3 executes overall control of the recording/reproducing apparatus 10 and arithmetic processing as instructed by an activated program. For example, the CPU 3 controls the operations executed by the user through the operator section 7 and the information recording, reproduction, and access operations that are executed on the semiconductor memory card 20 loaded on the semiconductor memory interface 1. To be more specific, in updating the data of a predetermined directory in the semiconductor memory card 20 in the present embodiment, the CPU 3 updates the data and management information of a predetermined directory on the basis of a file system control program 4a stored in the ROM 4, this program being described later.

The ROM 4 stores files, such as an operation program of the CPU 3 and a program loader. For example, with the recording/reproducing apparatus 10 of the present embodiment, the file system control program 4a for controlling the read/write (or update) operations to be executed on the data stored in the semiconductor memory card 20 (hereafter simply referred to as a file system control program) is stored in the ROM 4.

In the RAM 5, a data area and a task area are set son a temporary basis. The nonvolatile memory 6 is a memory in which data can be rewritten and the data recorded thereto can be retained after the power is turned off. The nonvolatile memory 6 stores various operational coefficients and program parameters.

The operator section 7 is made up of various controls, not shown, arranged on the housing of the recording/reproducing apparatus 10, supplying the information (namely, operation signals) about operations corresponding to operated controls to the CPU 3. The CPU 3 executes processing operations corresponding to the operational information received from the operator section 7, thereby realizing the operations specified by the user.

The USB interface 9 is connected to the USB terminal Tusb and, via the bus 8, to the signal processing section 2 and the CPU 3. It should be noted that, in the present embodiment, a USB interface is employed for the communication interface for data communication between the recording/reproducing apparatus 10 and an external apparatus; however the present invention is not restricted to this configuration. For example, if the external apparatus is a personal computer, another interface, such as IEEE (Institute of Electrical and Electronic Engineers) 1394, may be used. In addition to wired communication interfaces, a wireless communication interface, such as Bluetooth (trademark), may be used, for example.

<2. Exemplary Operation of Update Processing>

The following describes an example of processing that is executed by the recording/reproducing apparatus 10 to update the data in a predetermined directory stored in the semiconductor memory card 20.

[Update Processing Example 1]

(a) Overview of Update Processing

Figure 2:
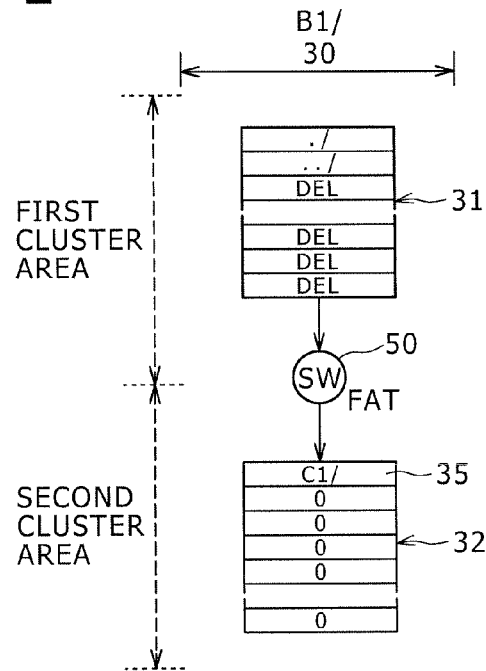
FIG. 2 is a diagram illustrating a directory configuration before updating a predetermined directory.
Figure 3:
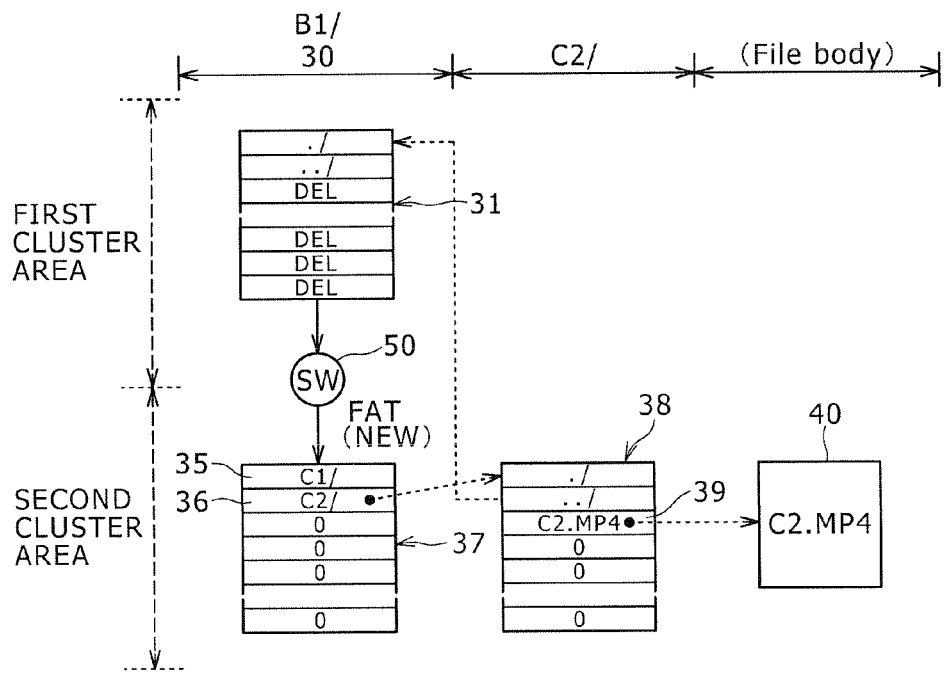
FIG. 3 is a diagram illustrating a directory configuration after updating a predetermined directory.

First, update processing example 1 will be outlined before describing a specific procedure of update processing example 1. Referring to FIG. 2 and FIG. 3, there are respectively shown directory configurations before and after the updating of a predetermined directory that is updated in this example.

In this example, updating of data contained in a directory 30 named "B1" (hereafter referred to as a B1 directory 30) will be described. In this example, it is assumed, as shown in FIG. 2, that directory entries indicative of file information contained in the B1 directory 30 be listed in an area 31 of the first cluster and an area 32 of the second cluster of the B1 directory 30.

It should be noted that, with the FAT file system, the cluster areas in which directory entries are listed are sequentially recorded from the head cluster area of the corresponding directory in an ordinary case as shown in FIG. 2; however, the present invention is not restricted to this configuration. The present invention is applicable to any file systems similar to the FAT file system even if these file systems allow the sequential recording of cluster areas from the beginning in which directory entries are listed.

It is also assumed that, in this example, the area 31 of the first cluster (hereafter referred to as a first cluster area 31) and the area 32 of the second cluster (hereafter referred to as a second cluster area 32) be linked with each other by FAT. This link is realized by recording cluster number 11 to the FAT entry of cluster number 10 of FAT if the first cluster area 31 and the second cluster area 32 are recorded to the areas of cluster number 10 and cluster number 11, respectively, for example. It should be noted that this link (hereafter referred to as a FAT chain) is indicated by "SW" 50 in FIG. 2. It should also be noted that, in FIG. 2, in order to clarify the link between the first cluster area 31 and the second cluster area 32, a FAT chain 50 is written in between but FAT is recorded to a FAT area other than the data area.

The following describes the configuration of each of cluster areas of the pre-updating B1 directory 30. In the first cluster area 31, directory entry "./" indicative of the directory of itself and directory entry "../" indicative of a parent directory are recorded in this order from the beginning, followed by deleted directory entries "DEL." To be more specific, in the first cluster area 31, the areas subsequent to directory entry "../" are free areas. It should be noted that deleted directory entry "DEL" referred to herein is a directory entry with the start byte being 0xE5.

In the second cluster area 32, a directory entry 35 indicative of a directory named "C1" (hereafter referred to as a C1 directory) is recorded at the beginning as shown in FIG. 2. Subsequently, terminal directories "0" are recorded. To be more specific, in the second cluster area 32, areas subsequent to the directory entry 35 indicative of C1 directory (hereafter referred to as a C1 directory 35) are free areas. It should be noted that the terminal directory "0" referred to herein is a directory entry with the start byte being 0x00.

It should be noted that, in the present embodiment, a directory entry to be updated is recorded to the second cluster area 32. In this example, as will be described later, the directory entry to be updated is terminal directory "0" immediately following the a C1 directory entry 35.

The main characteristics of the above-mentioned pre-updating B1 directory 30 are as follows:

(i) The directory entry to be updated (the terminal directory entry "0" immediately following the C1 directory entry 35) is arranged in areas of the second and subsequent clusters of a predetermined directory (the B1 directory 30); and (ii) In the first cluster area 31 of the B1 directory 30, all directory entries other than directory entries "./" and "../" are made deleted directory entries "DEL."

The reason for providing the above-mentioned characteristic (i) for the pre-updating B1 directory 30 in the present embodiment is as follows. As will be described later, in the information updating technique according to the present invention, the data of the cluster areas of the second and subsequent clusters including the updated directory entry is first recorded to a free area in the recording medium (the semiconductor memory card 20). Nest, by updating (or rewriting) FAT, the area of the first cluster of the updated directory is linked to the areas of the second and subsequent clusters after updating by the FAT chain. Namely, in the updating technique according to the present invention, the data in the areas of the second and subsequent clusters of a predetermined directory is updated in a collective manner. Consequently, in the present embodiment, the directory entry to be updated is arranged in areas of the second and subsequent clusters of a predetermined directory in advance.

The reason for providing the above-mentioned characteristic (ii) for the pre-updating B1 directory 30 is as follows. The information updating technique according to the present invention requires to arrange the directory entry to be updated in areas of the second and subsequent clusters of a predetermined directory in advance as described above. Therefore, the information updating technique according to the present invention determines whether the directory entry to be updated is arranged after the second cluster of a predetermined directory before executing update processing as described later. Normally, however, there are few cases in which directory entries to be updated are determined in advance.

On the other hand, giving the above-mentioned characteristic (ii) to the pre-updating B1 directory 30 as with the present embodiment easily allows the discrimination of the arrangement position of the directory entry to be updated by determining whether the B1 directory 30 has the above-mentioned characteristic (ii). To be more specific, if the B1 directory 30 has the above-mentioned characteristic (ii), it is automatically clear that the directory entry to be updated is arranged in areas of the second and subsequent clusters. Using this technique allows the easy discrimination of the arrangement position of directory entry to be updated also if the directory entry to be updated is not determined in advance.

It should be noted that, if the directory entry to be updated is determined in advance, a valid directory entry not to be updated may be recorded to an area other than directory entries "./" and "../" in the first cluster area 31. The valid directory entry referred to herein denotes a directory entry that is not free.

In update processing example 1, an update example is described in which a directory named "C2" (hereafter referred to as a C2 directory) including video data of file name "C2.MP4" for example is newly connected. To be more specific, in the pre-updating second cluster area 32 shown in FIG. 2, the terminal directory entry "0" immediately after the C1 directory entry 35 is changed to a directory entry 36 indicative of the C2 directory (hereafter referred to as a C2 directory entry 36). Therefore, in a post-updating second cluster area 37, the C2 directory entry 36 is recorded immediately after the C1 directory entry 35 in the second cluster area 37 as shown in FIG. 3.

Now, the directory configuration of the C2 directory to be added to the B1 directory 30 is described with reference to FIG. 3. It is assumed that, in an example shown in FIG. 3, a recording area of a directory entry indicative of file information contained in the C2 directory be configured by one cluster area 38. To this cluster area 38, directory entry "./" indicative of this directory and directory entry "../" indicative of the parent directory (the B1 directory 30) are recorded from the beginning of this cluster area. In addition, a directory entry 39 indicative of the "C2.MP4" file is recorded after directory entry "../," followed by terminal directory entries "0."

The cluster area 38 in the C2 directory is recorded to a cluster area other than the second cluster area 37 and these areas are connected to each other by pointers (positional information) (dashed-line arrows shown in FIG. 3). Further, in the example shown in FIG. 3, the "C2.MP4" file 40 is recorded to a cluster area indicated by the pointer contained in a directory entry 39 in the cluster area 38.

It should be noted that, in the drawings of directory configurations shown in FIG. 3 and on, the link between cluster areas by FAT is indicated by "SW" and solid-line arrows and the link between the cluster areas by the pointers of directory entry is indicated by dashed-line arrows.

(b) Processing Operation

Figure 4:
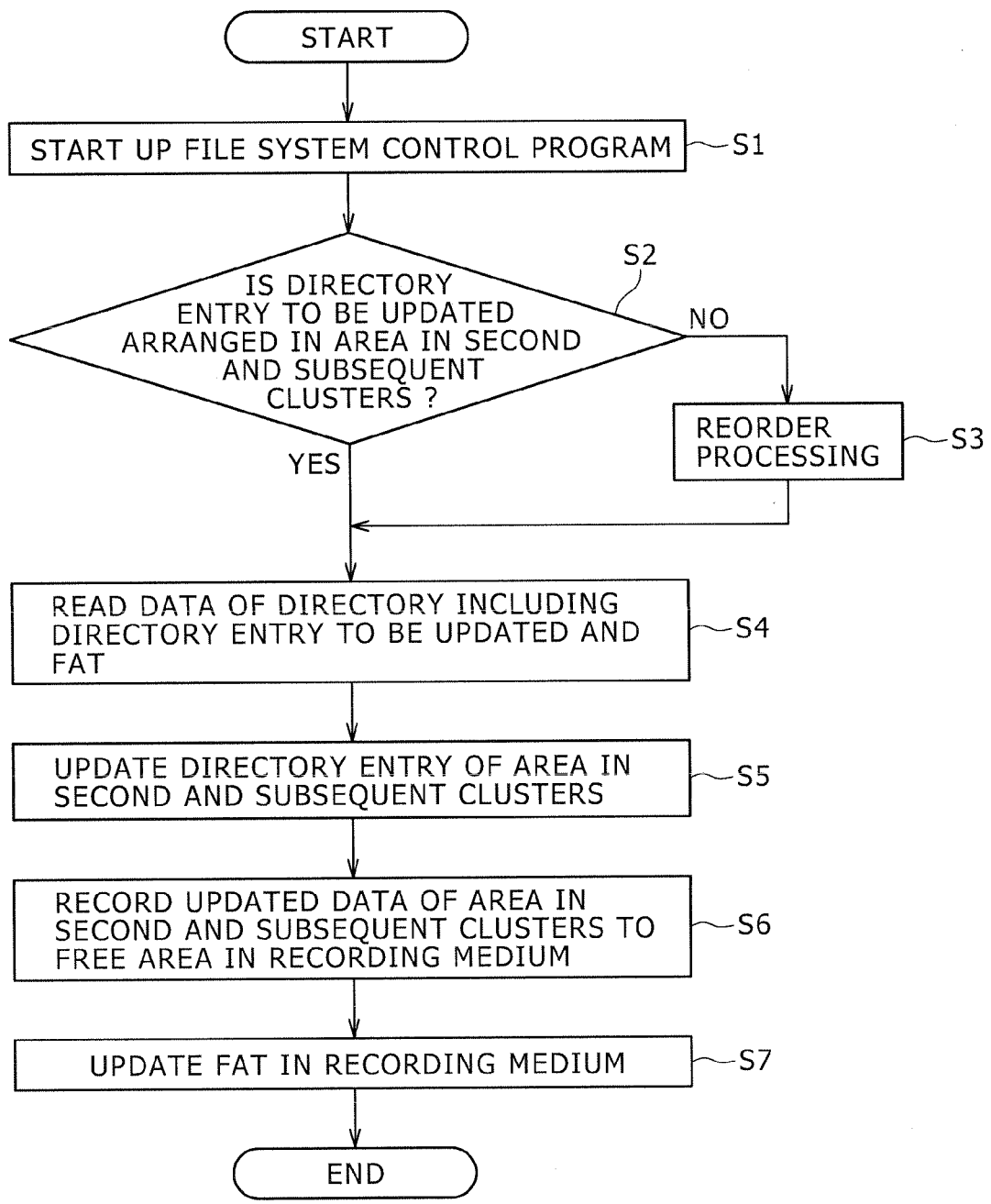
FIG. 4 is a flowchart indicating a procedure of an information updating technique of a recording medium practiced as one embodiment of the invention.

The following describes a specific processing procedure of update processing example 1 with reference to FIG. 4. FIG. 4 shows a flowchart indicative of the procedure of update processing example 1.

First, as a pre-stage of update processing, the CPU 3 obtains data taken by the imaging apparatus 21 made up of an external camera apparatus for example via the signal processing section 2 and the bus 8 and records the obtained data to the C2 directory as a "C2.MP4" file. It should be noted that the C2 directory containing the "C2.MP4" file is recorded to the RAM 5 or the nonvolatile memory 6. Next, the user loads the semiconductor memory card 20 onto the recording/reproducing apparatus 10 via the semiconductor memory interface 1. It should be noted that the semiconductor memory card 20 may be loaded in advance.

Next, the CPU 3 starts up a file system control program 4a stored in the ROM 4 (step S1). It should be noted that, in each step of the update processing to be described below, the CPU 3 executes control on each processing operation on the basis of the started-up file system control program 4a.

Next, the CPU 3 determines whether the directory entry to be updated is arranged in the second cluster area 32 (the second cluster) and subsequent areas of the B1 directory 30 (step S2). It should be noted that, in this example, the CPU 3 determines in step S2 whether all the directory entries other than the directory entries "./" and "../" in the first cluster area 31 of the B1 directory 30 are deleted directory entries "DEL" or not. If all the directory entries other than the directory entries "./" and "../" are found to be deleted directory entries "DEL," then the CPU 3 determines that the directory entry to be updated is arranged in the second cluster area 32 and subsequent areas. Namely, in this case, the decision in step S2 is YES.

In this example, all the directory entries other than directory entries "./" and "../" are deleted directory entries "DEL" in the first cluster area 31 of the pre-updating B1 directory 30 as shown in FIG. 2. Also, as described above, in this example, the terminal directory entry "0" immediately after the C1 directory entry 35 in the second cluster area 32 of the B1 directory 30 is changed to the C2 directory entry 36. Therefore, the decision in step S2 is YES. In this case, the CPU 3 reads the data and FAT of the pre-updating B1 directory 30 from the semiconductor memory card 20 into the RAM 5 (step S4).

It should be noted that the decision processing in step S2 is not restricted to the above-mentioned technique. For example, if a directory entry to be updated is determined in advance, the CPU 3 may directly determine whether the directory entry to be updated exists in the second cluster area 32 of the B1 directory 30.

On the other hand, if the directory entry to be updated is found arranged in the first cluster area 31 (the area of the first cluster) of the B1 directory 30 in step S2, then the decision in step S2 is NO. In this case, the CPU 3 automatically executes the processing of moving the directory entry to be updated to the second cluster area 32 and subsequent areas of the B1 directory 30 (step S3; hereafter this processing is referred to as reorder processing). The reorder processing in step S3 will be detailed later. When the reorder processing has been completed, the above-mentioned processing of step S4 starts.

After executing the processing of step S4, the CPU 3 changes the terminal directory entry "0" immediately after the C1 directory entry 35 in the second cluster area 32 of the B1 directory 30 to the C2 directory entry 36 (step S5). This links the C2 directory stored in the RAM 5 or the nonvolatile memory 6 in advance to the B1 directory 30, thereby updating the second cluster area 32 of the B1 directory 30.

Next, the CPU 3 writes the updated data to a free area (an area other than the pre-updating second cluster area 32) in the semiconductor memory card 20 (step S6). To be more specific, the CPU 3 writes the data of the post-updating second cluster area 37 and the data of the C2 directory (the cluster area 38 and the "C2.MP4" file) to a free area in the semiconductor memory card 20.

In doing so, the CPU 3 rewrites FAT in the RAM 5 such that the first cluster area 31 of the B1 directory 30 and the post-updating second cluster area 37 are linked with each other by a FAT chain. To be more specific, it is assumed that the first cluster area 31 and the pre-updating second cluster area 32 be recorded to the areas having cluster numbers 10 and 11 and the post-updating second cluster area 37 be recorded to an area having cluster number 12. In this case, the CPU 3 rewrites the cluster number recorded to the FAT entry having cluster number 10 of FAT from "11" to "12." It should be noted that, if a write area of the post-updating second cluster area 37 is determined in advance, the updating of FAT in the recording/reproducing apparatus 10 may be executed in the processing of step S5.

Figure 5:
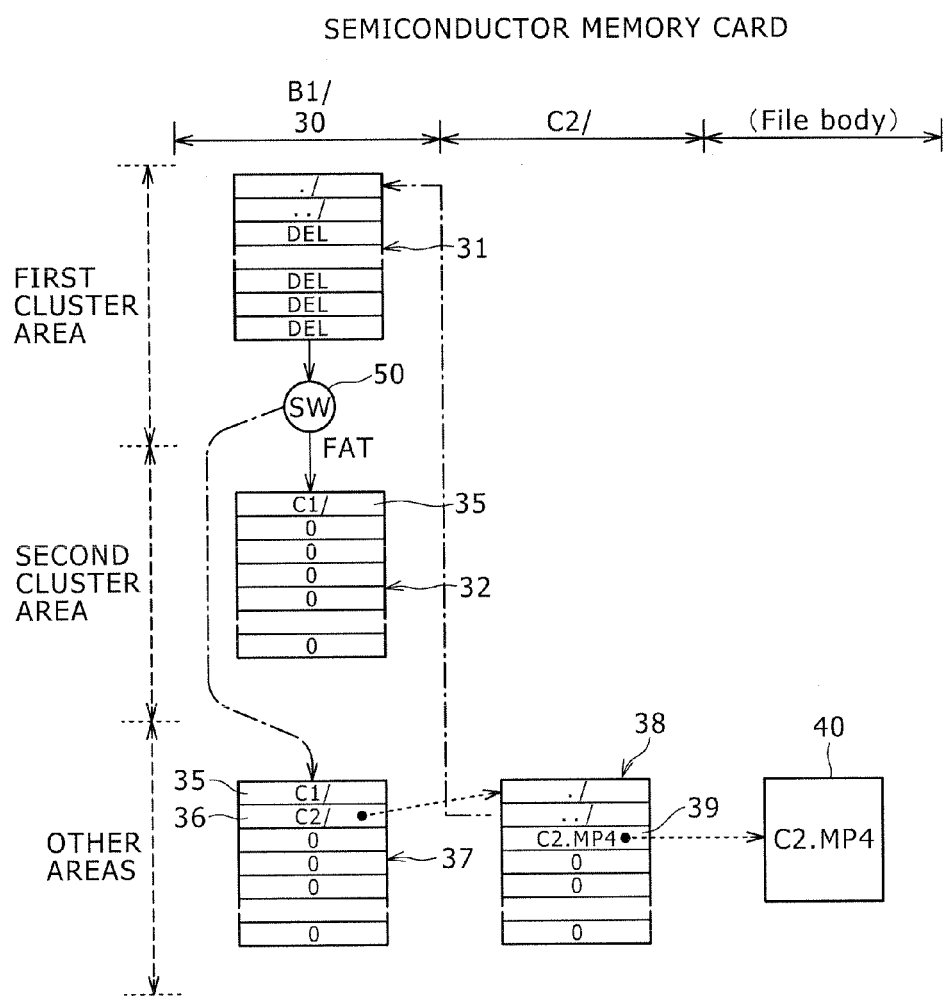
FIG. 5 is a diagram illustrating a directory structure after step S6 shown in FIG. 4 in update processing example 1.

Now, referring to FIG. 5, there is shown a directory configuration in which the data of the post-updating second cluster area 37 and the data of the C2 directory are written to the semiconductor memory card 20. In step S6, as described above, the data of the post-updating second cluster area 37 and the C2 directory (the directory entry data and the "C2.MP4" file) are written to a free area in the semiconductor memory card 20. However, the FAT altered (or updated) in the recording/reproducing apparatus 10 has not yet been reflected onto the semiconductor memory card 20. Therefore, in step S6, the first cluster area 31 of the B1 directory 30 is linked to the pre-updating second cluster area 32 by a FAT chain as it was before updating as shown in FIG. 5.

Next, the CPU 3 writes the FAT updated in the RAM 5 over the FAT of the semiconductor memory card 20, thereby updating the FAT of the semiconductor memory card 20 (step S7). This processing links the first cluster area 31 of the B1 directory 30 to the post-updating second cluster area 37 by the FAT chain 50 in the semiconductor memory card 20.

Figure 6:
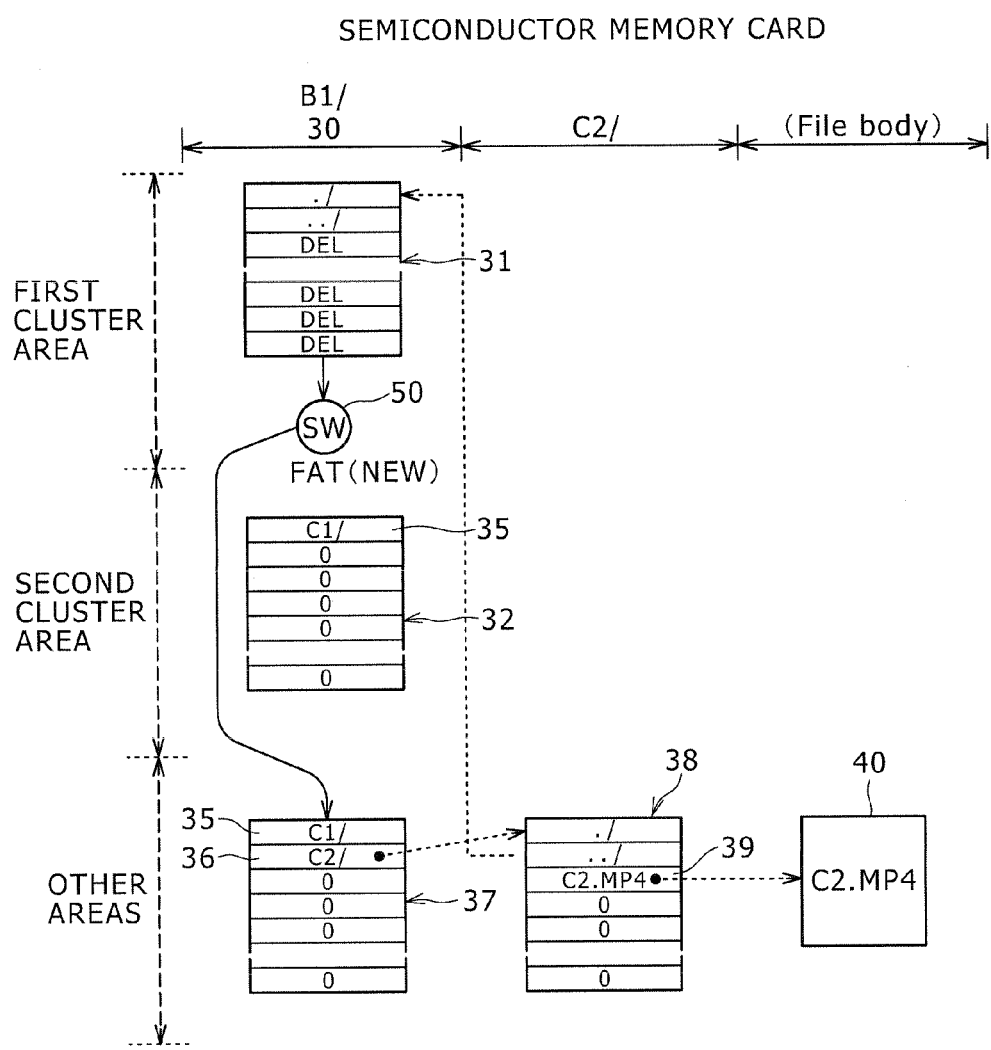
FIG. 6 is a diagram illustrating a directory structure after step S7 shown in FIG. 4 in update processing example 1.

Referring to FIG. 6, there is shown a directory configuration in the semiconductor memory card 20 after the FAT of the semiconductor memory card 20 has been updated in step S7. Updating the FAT of the semiconductor memory card 20 in step S7 switches the FAT chain 50 of the first cluster area 31 from the pre-updating second cluster area 32 to the post-updating second cluster area 37. Namely, in step S7, the area of the second cluster of the B1 directory 30 in the semiconductor memory card 20 is collectively rewritten from the pre-updating second cluster area 32 to the post-updating second cluster area 37. As a result, in step S7, FAT updating and directory entry updating are executed at the same time.

In update processing example 1, the data in the semiconductor memory card 20 is updated as described above. It should be noted that the pre-updating second cluster area 32 is freed after the processing of step S7 to provide a free area.

As described above, in this example, in updating the data in the semiconductor memory card 20, FAT updating and directory entry updating can be executed at the same time. Consequently, if the processing is discontinued halfway in the data update processing, there occurs no inconsistency between the FAT information and the directory entry, so that one of the states before and after updating can be restored, thereby enhancing data security. Namely, the information updating technique practiced as the present embodiment can further enhance data security for file systems that possibly cause inconsistencies between two or more items of management information, such as known FAT file systems.

In addition, in the present embodiment, the data of the areas of the second and subsequent clusters of a predetermined directory are collectively updated, so that not only data security can be enhanced but also the number of times file system synchronization processing is executed can be further reduced. Consequently, the information recording apparatus and the information updating method practiced as the present embodiment are suitably applicable to systems for which data security and high-speed processing are required.

Besides, in writing two or more items of updated data to the semiconductor memory card 20, arranging the cluster areas to which these items of data are written closer to each other can further enhance the processing speed.

[Update Processing Example 2]
(a) Overview of Update Processing

In the above-mentioned update processing example 1, the processing of newly writing the C2 directory entry 36 to the second cluster area 32 of the B1 directory 30 was described with reference to FIG. 2 and FIG. 3. However, the present invention is not restricted to this configuration. For example, in updating data in the C1 directory linked by the pointer (positional information) of the C1 directory entry 35 in the second cluster area 32 of the B1 directory 30 shown in FIG. 2, the update processing can also be executed in substantially the same manner as with the above-mentioned update processing example 1. With update processing example 2, a processing example such as mentioned above will be described.

Figure 7:
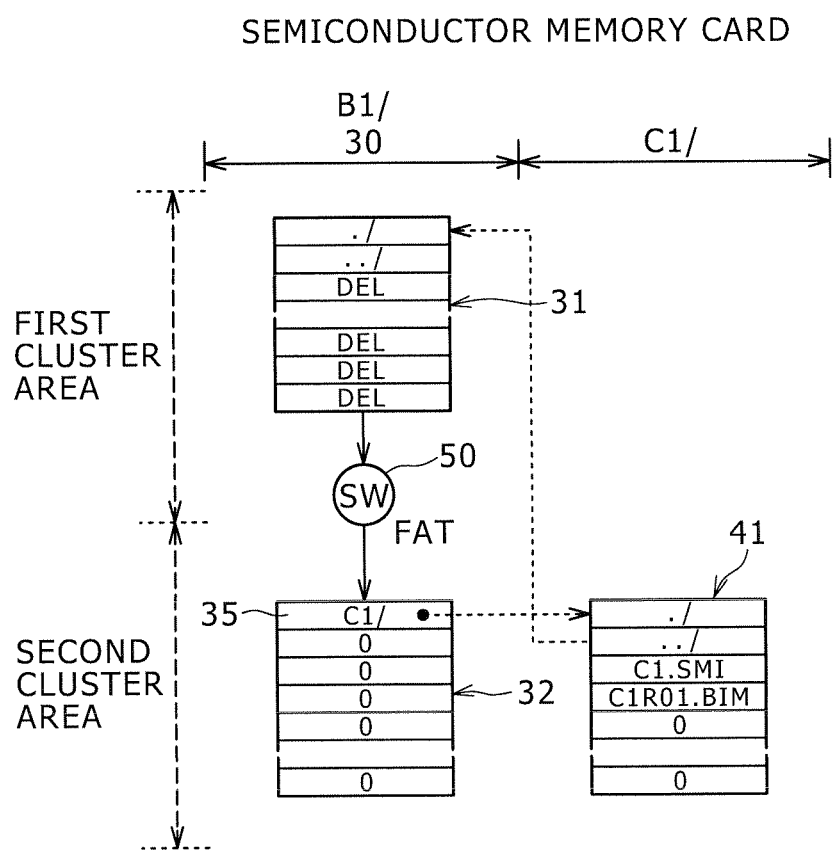
FIG. 7 is a diagram illustrating a directory structure before update processing in update processing example 2.

First, the processing of update processing example 2 will be overviewed. FIG. 7 shows a directory configuration of a pre-updating B1 directory 30 in update processing example 2. It should be noted that, in the directory configuration of the B1 directory 30 shown in FIG. 7, components similar to those of the B1 directory 30 shown in FIG. 2 are denoted by the same numerals. FIG. 7 also shows a directory configuration of a C1 directory linked by the pointer of a C1 directory entry 35.

It is assumed that the directory configuration of the B1 directory 30 in this example be substantially the same as that of the above-mentioned update processing example 1. Namely, it is assumed that directory entries indicative of file information contained in the B1 directory 30 be listed over two cluster areas (a first cluster area 31 and a second cluster area 32) and these two cluster areas be linked to each other by a FAT chain 50.

In addition, it is assumed, in this example, as shown in FIG. 7, that the directory entries indicative of file information contained in the C1 directory be listed in one cluster area 41. It should be noted that this cluster area 41 is recorded to an area other than the second cluster area 32 of the B1 directory 30.

In the example shown in FIG. 7, a directory entry "./" indicative of the directory thereof and a directory entry "../" indicative of the parent directory (the B1 directory 30) are recorded in the cluster area 41 in this order. Besides, in this example, the directory entries indicative of files named "C1.SMI" and "C1R01.BIM" are recorded after the directory entry "../" in this order. Then, terminal directories "0" are recorded after the directory entry of the "C1R01.BIM" file.

In this update processing example 2, an updating example in which video data of a newly obtained file name "C1.MP4" is newly linked to the pre-updating C1 directory having the above-mentioned configuration is described. To be more specific, an example is described in which, in the cluster area 41 of the pre-updating C1 directory shown in FIG. 7, the terminal directory entry "0" immediately after the directory entry indicative of the "C1R01.BIM" file is changed to the directory entry indicative of the "C1.MP4" file.

(b) Processing Operation

The following specifically describes a specific processing procedure of update processing example 2 with reference to FIG. 4 mentioned above.

First, for the pre-stage of the update processing, the CPU 3 obtains data taken by the external imaging apparatus 21 via the signal processing section 2 and the bus 8, for example, and records the obtained data to the RAM 5 or the nonvolatile memory 6 as a "C1.MP4" file. Next, the user loads the semiconductor memory card 20 on the recording/reproducing apparatus 10 via the semiconductor memory interface 1. It should be noted that the semiconductor memory card 20 may have been loaded in advance.

Then, like the above-mentioned update processing example 1, the CPU 3 starts up the file system control program 4a (step S1). It should be noted that, in each process of the update processing to be described below, the CPU 3 controls each processing operation on the basis of the started file system control program 4a like the update processing example 1.

Next, the CPU 3 determines whether the C1 directory entry 35 to be updated is arranged in a directory in a directory in the second and subsequent clusters of the B1 directory 30 (step S2). In this example, the C1 directory entry 35 is arranged in the second cluster area 32 in the B1 directory 30 as shown in FIG. 7, so that the decision of step S2 is YES. It should be noted that, if the C1 directory entry 35 is not found arranged in an area in the second and subsequent clusters of the B1 directory 30, then the CPU 3 executes the reorder processing (step S3) to be described later.

Next, the CPU 3 reads the data of the pre-update B1 directory 30 and FAT from the semiconductor memory card 20 into the RAM 5 (step S4). It should be noted that, in this read operation, the CPU 3 also reads the data of the cluster area 41 before updating of the C1 directory linked by the pointer of the C1 directory entry 35.

Next, the CPU 3 changes the terminal directory entry "0" immediately after the "C1R01.BIM" file in the cluster area 41 of the C1 directory to the directory entry indicative of the "C1.MP4" file. The "C1.MP4" file is linked to the cluster area 41 in the C1 directory by the pointer in this changed directory entry. Also, in this processing, in response to the changing of the cluster area 41, the CPU 3 updates the information (update date and so on, for example) contained in the C1 directory entry 35 recorded to the second cluster area 32 of the B1 directory 30 (step S5).

Then, the CPU 3 writes the data of the updated second cluster area, the data of the updated cluster area in the C1 directory, and the "C1.MP4" file to a free area in the semiconductor memory card 20 (step S6).

In this processing, the CPU 3 also rewrites FAT in the RAM 5 such that the first cluster area 31 of the B1 directory 30 is linked to the updated second cluster area by the FAT chain 50. It should be noted that, if a write area of the updated second cluster area is determined in advance, the updating of FAT in the recording/reproducing apparatus 10 may be executed in the processing stage of step S5.

Figure 8:
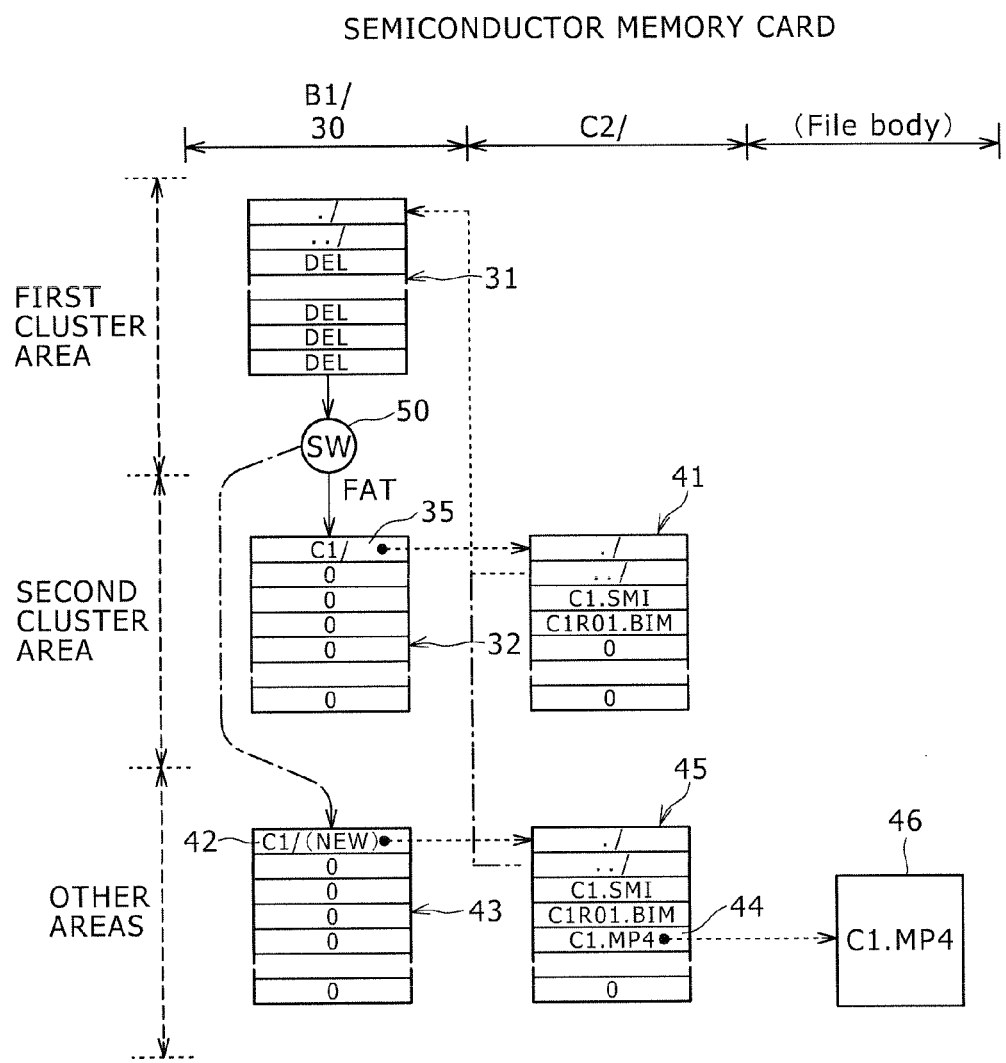
FIG. 8 is a diagram illustrating a directory structure after step S6 shown in FIG. 4 in update processing example 2.

Now, referring to FIG. 8, there is shown a directory configuration in the semiconductor memory card 20 after the processing of step S6. In step S6, the data of the updated second cluster area 43, the data of an updated cluster area 45 in the C1 directory, and a "C1.MP4" file 46 are written to a free area in the semiconductor memory card 20 as described above. However, the FAT changed (or updated) in the recording/reproducing apparatus 10 has not yet been reflected on the semiconductor memory card 20. Therefore, in step S6, the first cluster area 31 of the B1 directory 30 is linked to the pre-updating second cluster area 32 by the FAT chain 50 like the state before updating as shown in FIG. 8.

Next, the CPU 3 writes the FAT updated in the RAM 5 over the FAT of the semiconductor memory card 20, thereby updating the FAT of the semiconductor memory card 20 (step S7). This processing links the first cluster area 31 of the B1 directory 30 to the updated second cluster area 43 in the semiconductor memory card 20.

Figure 9:
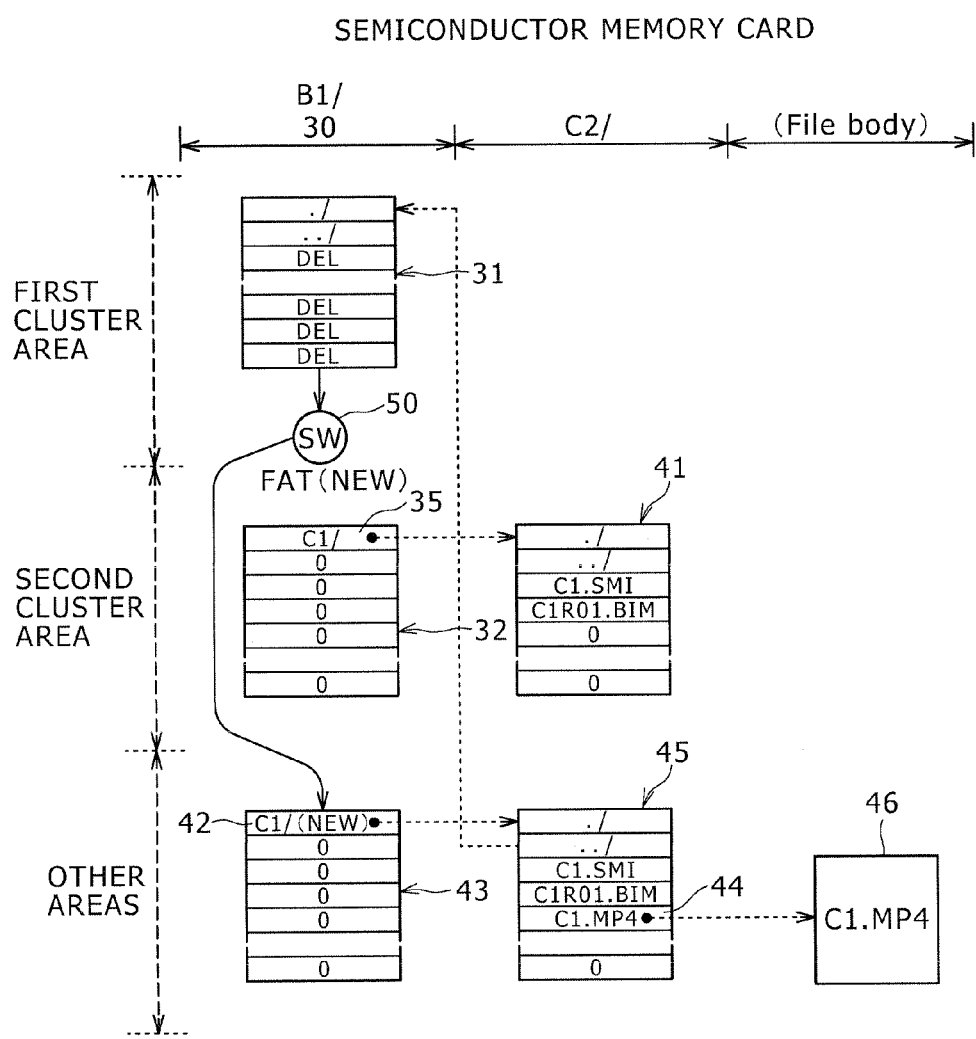
FIG. 9 is a diagram illustrating a directory structure after step S7 shown in FIG. 4 in update processing example 2.

Referring to FIG. 9, there is shown a directory configuration in the semiconductor memory card 20 after the updating of the FAT of the semiconductor memory card 20 in step S7. When the FAT of the semiconductor memory card 20 is updated in step S7, the FAT chain 50 of the first cluster area 31 is switched from the pre-updated second cluster area 32 to the post-updated second cluster area 43. Namely, in this processing example, the data of the area of the second cluster of the B1 directory 30 in the semiconductor memory card 20 can also be collectively replaced by the processing of step S7, thereby executing FAT updating and directory entry updating at the same time.

In update processing example 2, the data in the semiconductor memory card 20 is updated as described above. It should be noted that the pre-updating second cluster area 32 is freed after step S7 to provide a free area. Also, the cluster area 41 of the pre-updating C1 directory is freed after step S7 to provide a free area.

As described above, in this example, the information updating can also be executed on the semiconductor memory card 20 in substantially the same manner as the above-mentioned update processing example 1. Therefore, update processing example 2 also can also provide substantially the same effects as those of the above-mentioned update processing example 1.

It should be noted that, in the above-mentioned update processing examples 1 and 2, a directory entry to be updated is recorded to an area in the second cluster of a predetermined directory. However, the present invention is not restricted to this configuration. For example, if the length of a directory entry recording area is three or more clusters, a directory entry to be updated may be recorded to any area in the third and subsequent clusters. In this case, the update processing can also be executed in substantially the same manner as the above-mentioned techniques.

In the above-mentioned update processing examples 1 and 2, one directory entry is updated by way of example. The present invention is not restricted to this configuration. For example, two or more directory entries can also be updated in substantially the same manner as the above-mentioned techniques.

[Reorder Processing]

In the above-mentioned update processing examples 1 and 2, a directory entry to be updated is arranged in an area of the second and subsequent clusters of a predetermined directory in advance. However, the present invention is not restricted to this configuration. If a directory entry to be updated is arranged in an area in the first cluster, reorder processing is executed as described in steps 2 and 3 described above, thereby moving the directory entry to be updated to an area in the second and subsequent clusters. In what follows, an example of this reorder processing will be described with reference to drawings.

(a) Overview of Reorder Processing

Figure 10:
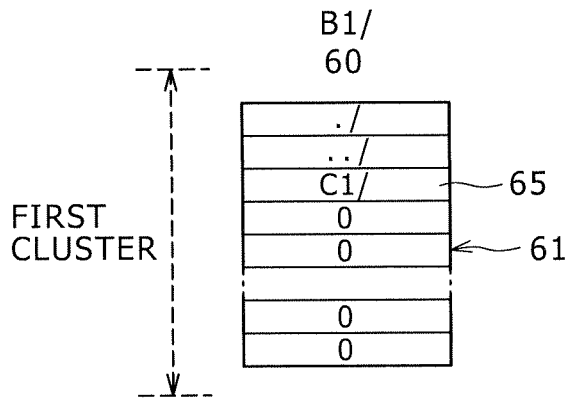
FIG. 10 is a diagram illustrating a directory configuration of a predetermined directory before reorder processing.

Before describing a specific procedure of reorder processing, an example of reorder processing to be executed here will be overviewed. Referring to FIG. 10, there is shown a directory configuration in which a directory entry to be updated is arranged in the first cluster of a predetermined directory.

FIG. 10 shows a directory configuration of a pre-updating B1 directory 60. In this example, directory entries indicative of file information contained in the B1 directory 60 are listed in one cluster area (a first cluster area 61). In the first cluster area 61, a directory entry "./" indicative of the directory thereof and a directory entry "../" indicative of a parent directory are recorded in this order from the beginning. Further, in the example shown in FIG. 10, a C1 directory entry 65 indicative of a C1 directory is recorded subsequent to the directory entry "../" followed by terminal directory entries "0."

In what follows, the C1 directory entry 65 in the first cluster area 61 of the B1 directory 60 is a directory to be updated and reorder processing for moving this directory to an area in the second cluster is described.

(b) Processing Operation

Figure 11:
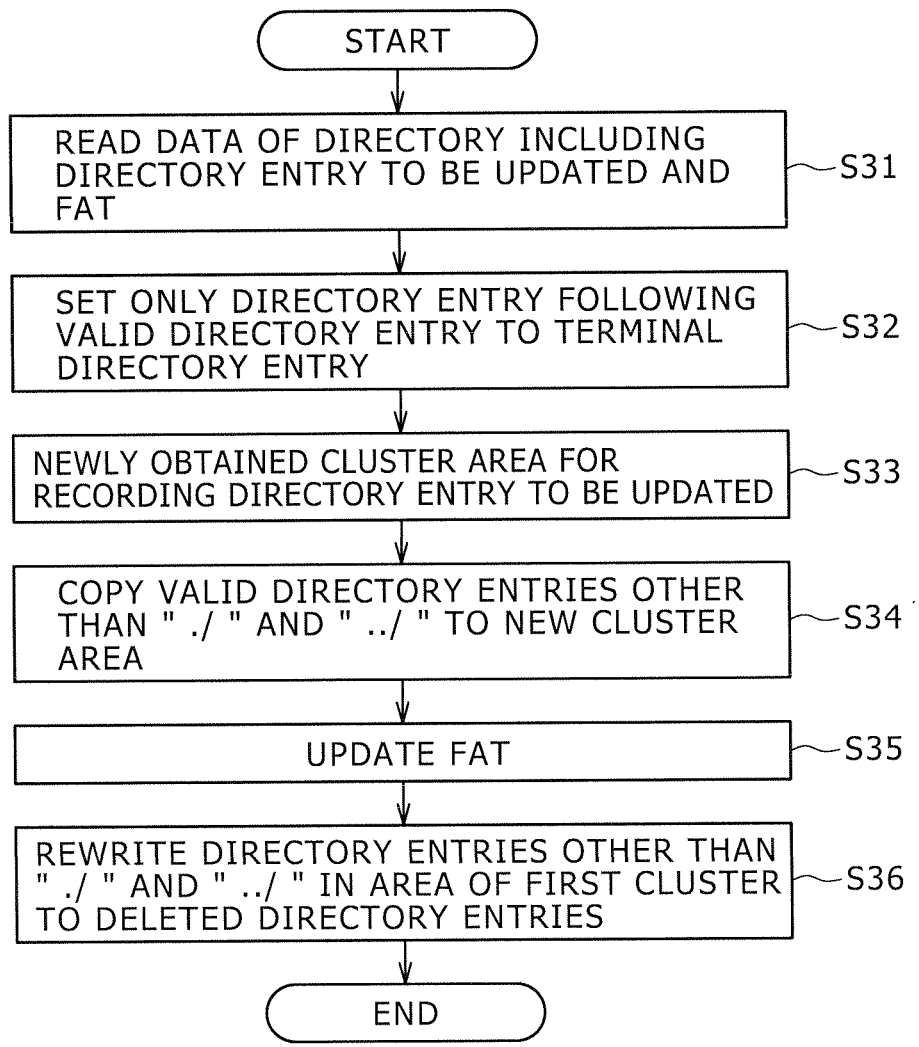
FIG. 11 is a flowchart indicative of a procedure of reorder processing.

The following describes an example of reorder processing to be executed by the recording/reproducing apparatus 10 practiced as one embodiment of the invention with reference to FIG. 11. It should be noted that FIG. 11 is a flowchart indicative of a procedure of the reorder processing to be executed in this example. In each process of the reorder processing to be described below, the CPU 3 controls each processing operation on the basis of the started file system control program 4a.

First, the CPU 3 reads the data of a predetermined directory containing a directory entry to be updated, namely the data of the pre-updating B1 directory 60 (FIG. 10) and FAT from the semiconductor memory card 20 into the RAM 5 (step S31).

Next, the CPU 3 sets only the directory entry subsequent to a valid entry in the first cluster area 61 to a terminal directory entry "0" (step S32).

Figure 12:
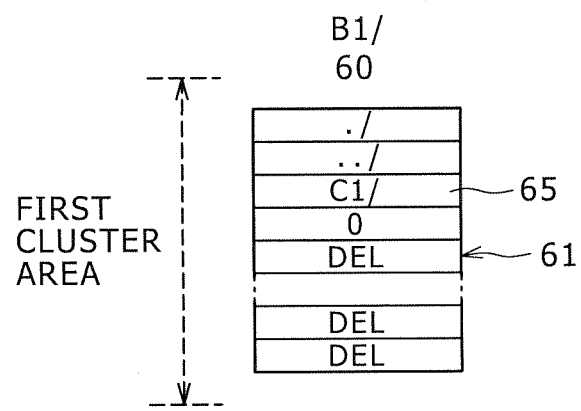
FIG. 12 is a diagram illustrating a directory structure after step S32 shown in FIG. 11.

Here, the processing of step S32 is described more specifically with reference to FIG. 12. FIG. 12 shows a directory configuration of the B1 directory 60 after step S32. In the example shown in FIG. 12, of the terminal directory entries "0" recorded in the C1 directory entry 65 and subsequent directory entries in the first cluster area 61, the CPU 3 keeps only the directory entry immediately after the C1 directory entry 65 as the remaining terminal directory entry "0." Then, the CPU 3 changes the directory entries subsequent to the remaining terminal directory entry "0" to deleted directory entries "DEL."

It should be noted that, if the length of the recording area of the directory entries of the pre-updating B1 directory 60 is two or more clusters and a valid directory entry is located at the end of the first cluster area 61, then the processing of step S32 is omitted.

Next, the CPU 3 obtains a new cluster area (step S33). Then, the CPU 3 copies the valid directory entry other than the directory entries "./" and "../" in the first cluster area 61 to the newly obtained cluster area (step S34). In this example, the C1 directory entry 65 is copied to the newly obtained cluster area.

Figure 13:
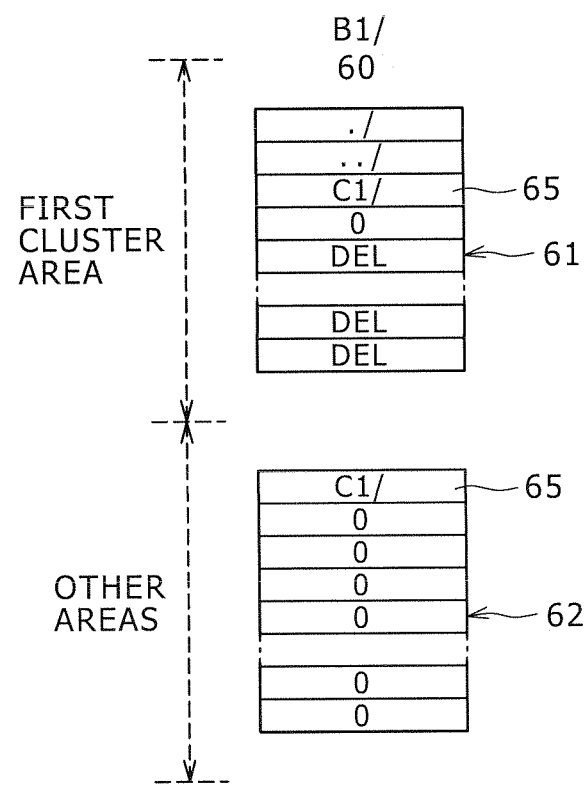
FIG. 13 is a diagram illustrating a directory structure after step S34 shown in FIG. 11.

FIG. 13 shows a directory configuration of the B1 directory 60 after step S34 and a configuration of the newly obtained cluster area. In the example shown in FIG. 13, the CPU 3 copies the C1 directory entry 65 of the first cluster area 61 to the beginning of the newly obtained cluster area 62 in step S34. Further, the CPU 3 sets all directory entries in the C1 directory entry 65 and subsequent directory entries in the newly obtained cluster area 62 to the terminal directory entries "0" in step S34.

After step S34, the CPU 3 updates the FAT such that the first cluster area 61 of the B1 directory 60 and the newly obtained cluster area 62 are linked with each other by the FAT chain (step S35).

Figure 14:
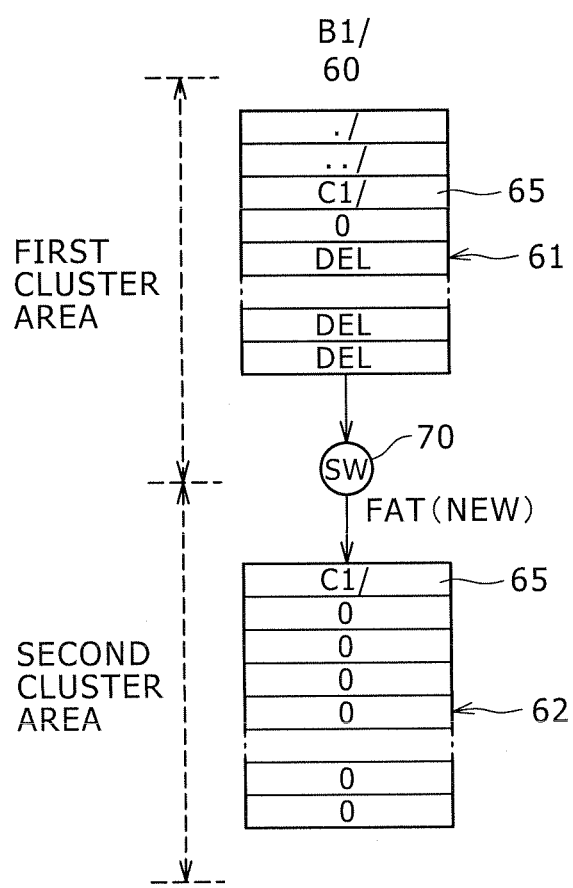
FIG. 14 is a diagram illustrating a directory structure after step S35 shown in FIG. 11.

FIG. 14 shows a directory configuration of the B1 directory 60 after updating in step S35. After step S35, the first cluster area 61 and the newly obtained cluster area 62 are linked with each other by the FAT chain 70 as shown in FIG. 14. Consequently, the newly obtained cluster area 62 provides a area for the second cluster of the B1 directory 60. It should be noted that, if the area for the second cluster exists in the pre-updating B1 directory 60, then the original area of the second cluster is freed.

Next, the CPU 3 rewrites the directory entries other than the directory entries "./" and "../" in the first cluster area 61 of the B1 directory 60 to deleted directory entries "DEL" (step S35).

Figure 15:
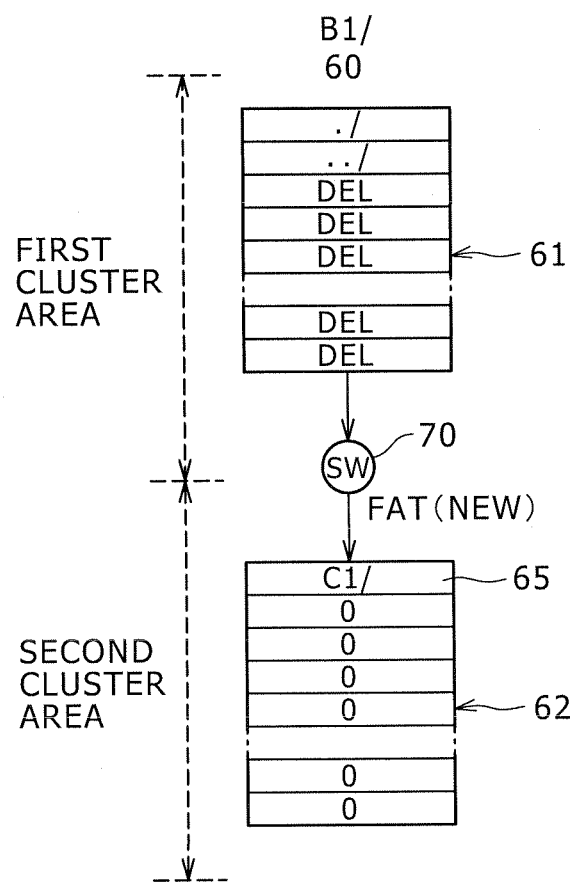
FIG. 15 is a diagram illustrating a directory structure after step S36 shown in FIG. 11.

FIG. 15 shows a directory configuration of the B1 directory 60 after step S36. As seen from FIG. 15, executing the above-described reorder processing of steps S31 through S36 allows the B1 directory 60 to be provided with the characteristics (i) and (ii) explained in the above-mentioned update processing example 1.

In this example, the reorder processing is executed as described above to move a directory entry to be updated to an area in the second and subsequent clusters in a predetermined directory. It should be noted that, in the above-mentioned processing example, a directory entry to be updated is moved to an area in the second cluster; however, the present invention is not restricted to this configuration. For example, a directory entry to be updated may be moved to an area in the third and subsequent clusters. In this case, the above-mentioned reorder processing technique is also applicable.

Further, the reorder processing technique is not restricted to the example described with reference to FIGS. 11 through 15. Any other reorder processing techniques can be used as far as these techniques move a directory entry to be updated to an area in the second and subsequent clusters of a predetermined directory.

In the above-mentioned embodiments, the configuration was described by way of example in which the information recording apparatus (or the information recording/reproducing apparatus) is set up as a dedicated apparatus with a file system control program preinstalled. However, the present invention is not restricted to this configuration. For example, the software (or the program) for executing the information update processing according to the present invention may be later installed on the information recording apparatus. In addition, the information processing apparatus on which the software (or the program) for executing the information update processing according to the present invention is installed is not restricted to the above-mentioned information recording/reproducing apparatus. For example, a personal computer may be used that can be connected to the above-mentioned information recording/reproducing apparatus to execute various kinds of data processing. Namely, a configuration may be used in which the software (or the program) for executing the information update processing according to the present invention is installed on an external apparatus, such as a personal computer for example, to execute the processing according to the present invention.

It should be noted that the software (or the program) for executing the update processing according to the present invention may be distributed in recording medium, such as an optical disk and a semiconductor memory, and downloaded through transmission means, such as the Internet.

In the above-mentioned embodiments, an information recording/reproducing apparatus for use in a system for editing video data and so on taken by the imaging apparatus of an external camera apparatus for example is mentioned by way of example as the information recording apparatus practiced as one embodiment of the invention. However, the present invention is not restricted to this configuration. For example, the present invention is also applicable to an information recording apparatus dedicated to recording. Besides, the present invention is also applicable to an apparatus with the recording/reproducing apparatus 10 and the imaging apparatus 21 shown in FIG. 1 unitized, namely, an imaging apparatus.

The present application contains subject matter related to that disclosed in Japanese Priority Patent Application JP 2010-027363 filed in the Japan Patent Office on Feb. 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording apparatus comprising:
a loading section configured to be loaded with a computer-readable recording medium for managing a file on the basis of a file allocation tables (FAT) file system; and
a processor including a control section configured, in updating at least one directory entry recorded to a pre-updating area in a second and subsequent dusters in a recording area of directory entries in a predetermined directory in said recording medium, to read data of a recording area of the directory entries from said recording medium, update at least said one directory entry recorded to a post-updating area of the second and subsequent clusters, record the updated data of the post-updating area in the second and subsequent dusters to a free area in said recording medium, and update the file allocation tables of said recording medium and management information corresponding to the file allocation tables such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster,
wherein the data of the area of the first cluster includes, at the beginning of the first cluster, a first entry indicating a self entry and a second entry indicating a parent directory, and the data of the area of the second cluster includes, at the beginning of the second cluster, a third entry other than the first entry or the second entry.

2. The information recording apparatus according to claim 1, wherein, if said at least one directory entry to be updated exists in the first cluster in said recording area, said control section moves said at least one directory entry to be updated to the area in the second and subsequent clusters in said recording area.

3. The information recording apparatus according to claim 2, wherein said control section records a directory entry indicative of the directory thereof and a directory entry indicative of a parent directory to an area in the first cluster in said recording area and records a deleted directory entry to an area other than the area in the first cluster in the area of which the directory entry indicative of the directory thereof and the directory entry indicative of the parent directory are recorded.

4. The information recording apparatus according to claim 1, wherein said control section records the updated data of the post-updating area in the second and subsequent clusters and data of an area indicated by positional information included in the updated directory entry to the free area of said recording medium.

5. The information recording apparatus according to claim 1, further comprising said recording medium.

6. An imaging apparatus comprising:
an imaging section including a camera;
a loading section configured to be loaded with a computer-readable recording medium for managing a file on the basis of a file allocation tables (FAT) file system; and
a processor including a control section configured to control predetermined processing to be executed on data taken by said imaging section and, in updating at least one directory entry recorded to a pre-updating area in a second and subsequent clusters in a recording area of directory entries in a predetermined directory in said recording medium, read data of a recording area of the directory entries from said recording medium, update at least said one directory entry recorded to a post-updating area of the second and subsequent clusters, record the updated data of the post-updating area in the second and subsequent clusters to a free area in said recording medium, and update the file allocation tables of said recording medium and management information corresponding to the file allocation tables such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster,
wherein the data of the area of the first cluster includes, at beginning of the first cluster, a first entry indicating a self entry and a second entry indicating a parent directory, and the data of the area of the second cluster includes, at the beginning of the second cluster, a third entry other than the first entry or the second entry.

7. An information updating method comprising the steps of:
in updating at least one directory entry recorded to a pre-updating area in a second and subsequent clusters in a recording area of directory entries in a predetermined directory in a computer-readable recording medium loaded on an information recording apparatus, said recording medium managing a file allocation tables (FAT) file system, reading data of the recording area by said information recording apparatus from said recording medium;

updating, by said information recording apparatus, said at least one directory entry read above in a post-updating area in the second and subsequent clusters in said recording area;

recording, by said information recording apparatus, the updated data in the post-updating area in the second and subsequent clusters to a free area in said recording medium; and updating, by said information recording apparatus, the file allocation tables and management information corresponding to the file allocation tables of said recording medium such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster, wherein the data of the area of the first cluster includes, at the beginning of the first cluster, a first entry indicating a self entry and a second entry indicating a parent directory, and the data of the area of the second cluster includes, at the beginning of the second cluster, a third entry other than the first entry or the second entry.

8. A non-transitory computer-readable storage medium on which is recorded a program for making an information processing apparatus execute processing comprising the steps of:

in updating at least one directory entry recorded to a pre-updating area in a second and subsequent clusters in a recording area of directory entries in a predetermined directory in a computer-readable recording medium loaded on an information recording apparatus, said recording medium managing a file allocation tables (FAT) file system, reading data of the recording area from said recording medium;

updating said at least one directory entry read above in a post-updating area iii the second and subsequent clusters in said recording area;

recording the updated data in the post-updating area in the second and subsequent clusters to a free area in said recording medium; and updating the file allocation tables and management information corresponding to the file allocation tables of said recording medium such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster, wherein the data of the area of the first cluster includes, at the beginning of the first cluster, a first entry indicating a self entry and a second entry indicating a parent directory, and the data of the area of the second cluster includes, at the beginning of the second cluster, a third entry other than the first entry or the second entry.

9. An information recording apparatus comprising:

loading means for being loaded with a computer-readable recording medium for managing a file on the basis of a file allocation tables (FAT) file system; and a processor including control means for, in updating at least one directory entry recorded to a pre-updating area in a second and subsequent clusters in a recording area of directory entries in a predetermined directory in said recording medium, reading data of a recording area of the directory entries from said recording medium, updating at least said one directory entry recorded to a post-updating area of the second and subsequent clusters, recording the updated data of the post-updating area in the second and subsequent clusters to a free area in said recording medium, and updating the file allocation tables of said recording medium and management information corresponding to the file allocation tables such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster, wherein the data of the area of the first cluster includes at the beginning of the first cluster, a first entry indicating a self entry and a second entry indicating a parent directory, and the data of the area of the second cluster includes, at the beginning of the second cluster, a third entry other than the first entry or the second entry.

10. An imaging apparatus comprising:

imaging means including a camera;

loading means for being loaded with a computer-readable recording medium for managing a file on the basis of a file allocation tables (FAT) file system; and a processor including a control means for controlling predetermined processing to be executed on data taken by said imaging means and, in updating at least one directory entry recorded to a pre-updating area in a second and subsequent clusters in a recording area of directory entries in a predetermined directory in said recording medium, reading data of a recording area of the directory entries from said recording medium, updating at least said one directory entry recorded to a post-updating area of the second and subsequent clusters, recording the updated data of the post-updating area in the second and subsequent clusters to a free area in said recording medium, and updating the file allocation tables of said recording medium and management information corresponding to the file allocation tables such that the area in which the updated data of the area in the second and subsequent clusters is recorded is linked to the area in a first cluster of the recording area in said predetermined directory, wherein the data of the area in the second cluster is collectively replaced or rewritten from the pre-updating second cluster area to the post-updating second cluster area, and wherein FAT updating and directory entry updating are executed at the same time through rewriting a FAT chain to link the second and subsequent clusters with the first cluster, wherein the data of the area of the first cluster includes, at the beginning of the first cluster, a first entry indicating a self entry and a second entry indicating a parent directory, and the data of the area of the second cluster includes, at the beginning of the second cluster, a third entry other than the first entry or the second entry.

* * * * *